United States Patent [19]

Saugmann et al.

[11] Patent Number: 5,685,990
[45] Date of Patent: Nov. 11, 1997

[54] SYSTEM AND A PROCESS FOR MEMBRANE FILTRATION OF A DISPERSION

[75] Inventors: Aksel Saugmann, Gadbjerg; Erik Krabsen, Herning; Niels Klausen Ottosen, Silkeborg, all of Denmark

[73] Assignee: MD Foods A.M.B.A., Viby J., Denmark

[21] Appl. No.: 313,275

[22] PCT Filed: May 3, 1993

[86] PCT No.: PCT/DK93/00148

§ 371 Date: Oct. 28, 1994

§ 102(e) Date: Oct. 28, 1994

[87] PCT Pub. No.: WO93/22037

PCT Pub. Date: Nov. 11, 1993

[30] Foreign Application Priority Data

May 4, 1992 [DK] Denmark ................... 0584/92

[51] Int. Cl.$^6$ ................................................. B01D 61/00
[52] U.S. Cl. ................... 210/650; 210/641; 210/651; 210/652; 210/195.2; 210/257.2; 426/491; 426/801; 426/583
[58] Field of Search ................. 210/641, 651, 210/650, 652, 195.2, 257.2; 426/491, 801, 583

[56] References Cited

U.S. PATENT DOCUMENTS

| | | | |
|---|---|---|---|
| 3,707,770 | 1/1973 | Timmins et al. | 426/491 |
| 4,000,065 | 12/1976 | Ladha et al. | 210/651 |
| 4,042,575 | 8/1977 | Eustache | 210/641 |
| 4,202,909 | 5/1980 | Peterson, Jr. | 426/491 |
| 4,355,048 | 10/1982 | Schaap et al. | 426/491 |
| 4,369,266 | 1/1983 | Kuhls et al. | 528/482 |
| 4,497,836 | 2/1985 | Marquardt et al. | 426/239 |
| 4,574,049 | 3/1986 | Pittner | 210/641 |
| 5,028,436 | 7/1991 | Gauri | 210/651 |
| 5,306,427 | 4/1994 | Xu | 210/641 |
| 5,338,457 | 8/1994 | Capozzola et al. | 210/641 |
| 5,338,553 | 8/1994 | Johnson et al. | 426/583 |
| 5,356,639 | 10/1994 | Sameson et al. | 426/491 |

FOREIGN PATENT DOCUMENTS

| | | |
|---|---|---|
| 0 015 481 | 9/1980 | European Pat. Off. . |
| 0 335 647 | 10/1989 | European Pat. Off. . |
| 0 404 057 | 12/1990 | European Pat. Off. . |
| 0 460 339 | 12/1991 | European Pat. Off. . |
| 2 354 475 | 5/1974 | Germany . |
| 36 26 498 | 2/1988 | Germany . |
| A-63-111904 | 5/1988 | Japan . |

OTHER PUBLICATIONS

Dialog Information Service, File 51, FSTA, Dialog accession No. 00048244, FSTA accession No. 72-05-vp0758, Fenton-May, R.I.: "The use of reverse osmosis and ultrafiltration in the food industry", Dissertation Abstracts International. Section B. The Sciences and Engineering 1971, 32 (6) 3323–3324: Order No. 71-25469.

Dialog Information Service, File 50, CAB abstracts, Dialog accession No. 1215157, CAB accession No. 0D054-00170, Hramtsov, A.G. et al.: "Milk sugar making by membrane technology", Brief Communications of the XXIII International Dairy Congress, Montreal, Oct. 8–12, 1990, vol. II.

(List continued on next page.)

Primary Examiner—Ana Fortuna
Attorney, Agent, or Firm—Oliff & Berridge

[57] ABSTRACT

A dispersion having an aqueous phase is filtered by a purality of membranes connected to pass the retentate or a portion of the retentate from one membrane step is used for feeding the one or more succeeding steps, and the permeate resulting from the plurality of membranes is subjected to a concentration step to produce a concentrate containing an increase concentration of dry matter, which is returned as a portion of the feeding dispersion to one or more of the plurality of membranes. The system provided with the membranes and concentration units and recirculation conduits is also disclosed.

25 Claims, 5 Drawing Sheets

OTHER PUBLICATIONS

Dialog Information Service, File 50, CAB abstracts, Dialog accession No. 0403724, CAB accession No. 0D048–00742, Fiedler, J.: "Formation of deposits by milk salts and whey proteins during evaporation of whey and ultrafiltration permeate in a falling–film evaporator. Ansatzbildung durch Milksaltze und Molkenproteine beim Eindampfen von Molke und Ultrafiltrations–Permeat in einem Fallfilmverdampfer.", Thesis, Technische Universitat Munchen, 1985, 215pp. (9pp. of ref.).

Dialog Information Service, File 53, CAB abstracts, Dialog accession No. 1008615, CAB accession No. 0D042–04188, Ernstrom, C.A. et al.: "Cheese base for processing. A high yield product from whole milk by ultrafiltration." Journal of Dairy Science 1980, 63 (2), 228–234 (15 ref.).

Dialog Information Service, File 5, BIOSIS, Dialog accession No. 245576, BIOSIS accession No. 66002181, Newstead, D.F. et al.: "The use of permeate from the ultrafiltration of whey for standardizing the protein concentration of recombined evaporated milk.", N A J Dairy Sci Technol 12 (3), 1977, (recd 1978) 146–151.

SYSTEM AND A PROCESS FOR MEMBRANE FILTRATION OF A DISPERSION

TECHNICAL FIELD

The present invention relates to a system for membrane filtration of a dispersion having an aqueous continuous phase, said system comprising one or more membrane filtration units, also called primary membrane filtration units, where each unit is associated with a feeding pipe, a retentate exit pipe, and a permeate exit pipe, said retentate exit pipe of one unit, if desired, being coupled to or being the only inlet to the feeding pipe of one or more succeeding units.

Furthermore, the invention relates to a process for membrane filtrating a dispersion having an aqueous continuous phase in one or more membrane filtration steps, where a feeding dispersion fed to a filtration membrane is separated in each step into a retentate retained by the filtration membrane and a permeate passing through said filtration membrane, whereby the retentate from one step can be used, if desired, as a feeding dispersion or a portion thereof in one or more succeeding steps.

A specific embodiment of the invention relates to a process for regulating milk solids components in concentrated milk products in connection with their manufacture by ultrafiltration of milk. The concentrated milk products achieved by this embodiment of the invention are preferably intended for the manufacture of cheese, in particular fresh unripened cheese, curd or cheese in brine, such as White Cheese, Feta, Domiaty, Mozzarella, Kaskaval and Kefalotyri.

BACKGROUND ART

In order to support the understanding of the application some expressions used in the present specification and claims have been defined below.

Membrane filtration: Filtration through a membrane where a dispersion, here called a feed dispersion, is separated into a retentate not passing through the membrane and a permeate passing through said membrane. The retentate is a fluid dispersion in which the amount of dispersing phase has been increased relative to the amount thereof in the feed dispersion. Examples of membranes to be used by the membrane filtration are MF, UF, NF, and RO membranes, which have been defined in greater detail below.

Retentate: The fraction of a feed dispersion which is retained by a filtration membrane.

Permeate: The fraction of a feed dispersion which passes through a filtration membrane.

Microfiltration (MF) Filtration through an MF-membrane, i.e. a membrane of a pore size of 0.08 µm to 2.5 µm corresponding to a molecular cutoff value of 150 000 to 5 000 000.

Ultrafiltration (UF): Filtration through a UF-membrane, i.e. a membrane of a pore size of 0.002 µm to 0.4 µm corresponding to a molecular cutoff value of 500 to 800 000.

Nanofiltration (NF): Filtration through an NF-membrane, i.e. a membrane of a pore size of 0.0007 µm to 0.007 µm corresponding to a molecular cutoff value of 140 to 15 000.

Hyperfiltration (HF) or reverse osmosis (RO): Filtration through an RO-membrane. When an RO-membrane is used, the permeate is nothing but water in some cases. In other cases metal ions and aqueous salts may also pass through an RO-membrane. In connection with an RO-membrane it is hardly possible directly to refer to a pore size, but at least theoretically speaking a pore size of between 0 and 0.0015 µm corresponding to a molecular cutoff value of between 0 and 300 applies.

Diafiltration: Filtration through a membrane, especially a UF-membrane or an NF-membrane, where water has been added to the feed dispersion. It is possible to reduce the amount of permeable solids in the retentate by using diafiltration.

Feed dispersion: The material fed to a membrane filtration unit. The feed dispersion can be any type of dispersion where the disperse phase can include particles of molecular-disperse, colloid-disperse, and/or coarse-disperse particle sizes. In practise the present invention only refers to feed dispersions in which the continuous phase of the dispersion is based on water.

Permeable solids: Solids capable of passing through the used filtration membrane, i.e. in practise all permeate ingredients apart from water. The ingredients of the feed dispersion to be considered permeable solids are determined by the filtration membrane used.

During the membrane filtration, the permeate containing permeable solids and water passes through the filtration membrane. The remaining portion of the feed dispersion, viz. the retentate, leaves the filtration unit without passing through the filtration membrane. The weight ratio of permeate to retentate depends on various factors, such as the pressure difference above the membrane, the pore size of said membrane, the area as well as coating or fouling degree of said membrane. The individual membrane units may be coupled in series or in parallel. For some purposes, such as ultrafiltration of milk or milk products, the membrane capacity is advantageously utilized by the individual membrane units being coupled in series in such a manner that the retentate of the first membrane unit is used as feed dispersion in the succeeding membrane unit etc.

The retentate leaving a membrane filtration unit represents per sea dispersion and accordingly it includes a disperse phase and a continuous phase. When the disperse phase exclusively contains particles unable to pass through the filtration membrane, and the continuous phase exclusively contains permeable solids and water, the continuous phase of the retentate is at least approximately of the same composition as the permeate. An exception may be the situation where in addition to particles being too large to pass through the membrane the dispersion also contains particles being permeable per se but which in practise adhere to the impermeable particles in the retentate with the result that the amount of said permeable particles in the permeate is lower than the amount thereof in the continuous phase of the retentate.

When it is desired that also relatively small particles or molecules are separated off as retentate, it is possible, at least theoretically, to carry out the filtration by means of a filtration membrane having a small pore size. In practise problems do, however, arise as the filtration capacity is heavily reduced in connection with a reduced pore size.

The choice of pore size of the membrane is thus of decisive importance for the capacity of a membrane filtration plant. A too large pore size has, however, the effect that some of the ingredients desired in the retentate follow the permeate.

When it is desired to ensure a retaining of ingredients of a relatively low molecular weight by using a membrane of a small molecular cutoff value, said membrane is, as previously mentioned, quickly fouled with the result that the filtration capacity is reduced. Accordingly, a demand exists for a system and a process ensuring on one hand a commercially acceptable filtration capacity and on the other hand that relatively low-molecular ingredients, or at least a portion thereof, can be maintained in the retentate.

It is known to reduce the amount of permeable solids in the continuous phase of the retentate simply by diluting the continuous phase of the feed dispersion with water, i.e. by carrying out a so-called diafiltration. Then it is possible to obtain a larger permeate fraction while the amount of retentate is unchanged. In case of dissolved permeable solids, the concentration thereof in the continuous phase of the feed dispersion is reduced by the diafiltration, whereby the concentration and consequently also the amount of the permeable solids are reduced in the continuous phase of the retentate.

Attempts at increasing the amount of the permeable solids in the retentate have revealed, that such an increase requires a feeding of said solids to the feed dispersion. In connection with production of retentate to be used in articles of food, such an addition is, however, undesired and in some cases, such as in connection with milk products, even directly forbidden in some countries.

The above problems of membrane filtrating fat and protein-containing aqueous dispersion are within the food industry for instance found in the production of many dairy products where a starting material or an intermediary product, such as milk, milk products or milk-like products, is concentrated by way of ultrafiltration in an ultrafiltration plant. This ultrafiltration plant is based on an ultrafiltration membrane (UF membrane) retaining fat and protein whereas lactose, low-molecular protein substances, salts, and water can pass through the UF membrane. Cow's milk, which may be homogenized, is generally used as a starting material in the manufacture of cheese according to the classic method. The milk may be used as whole milk, i.e. with its total solids content, or with a reduced fat content, or with an increased fat content by the addition of cream.

In the manufacture of cheese it is known to ultrafiltrate the milk to the desired solids content in the finished cheese. This is normally done in a commercial ultrafiltration system comprising a plurality of modules, each of which is composed of a plurality of membrane coated plates which together provide the desired membrane area in each module. Ducts are arranged in the module and conduits between the modules such that the liquid to be concentrated is conveyed through the modules substantially in series, while the permeate is conveyed in parallel from these to a collector. Such ultrafiltration of milk primarily involves concentrating the protein and fat content of the milk, while a major portion of lactose and salts enters into the permeate from the ultrafiltration.

U.S. Pat. No. 4,497,836 discloses a process for producing a whey concentrate which is suitable for use in infant food formulas, wherein cheese whey is subjected to ultrafiltration to produce a protein-rich retentate fraction and a lactose-rich permeate fraction, said permeate fraction having a mineral salt content from the whey of 9–12% on dry solids basis, the permeate fraction is subjected to concentrating and demineralization by reverse osmosis or concentrating by vacuum evaporation followed by demineralization by electrodialysis, and the demineralized permeate is blended with the protein-rich retentate from the ultrafiltration in such proportions as to provide the desired lactose and mineral salt contents in the blended product. This process thus involves ultrafiltration of whey, wherein mineral salts are removed from the permeate, while lactose is retained to the greatest extent possible and added to the concentrated product from the ultrafiltration.

Lactose is a low-molecular substance and is therefore only retained to a slight degree by ultrafiltration. Thus the lactose usually follows the aqueous permeate in dissolved form, which means that the concentration of lactose in the retentate is usually substantially lower than the concentration of lactose in the feed material.

The ultrafiltration of dispersions is often performed as a stepwise process, the retentate of the first step being used as feed dispersion in the succeeding step. The ultrafiltration can often be combined with diafiltration, according to which water is added to the feed dispersion in one or more of said steps.

If the ultrafiltered dispersion for instance is a milk product, it is possible to reduce the content of lactose in the retentate by way of diafiltration independent of the amount of fat and protein contained therein as it is possible to vary the amount of water being added to the feed dispersion. The addition of large amounts of water has the effect that the concentration of lactose in the water phase is reduced. The portion of the water phase remaining in the retentate contains thus a lower amount of lactose. In other words, a higher amount of lactose enters the permeate phase.

The diafiltration can also be used for regulating the content of minerals in the retentate, such as dissolved salts.

The permeate resulting from the membrane filtration is often a waste product involving disposal problems due to the high content of permeable solids, such as lactose, as such solids may have a strongly polluting effect on the environment.

In addition, some of the substances present in the permeate are desirable in some type of products, and accordingly a selective retaining of some of these substances in the retentate resulting from the membrane filtration would be advantageous.

EP publication No. 460 339 (Perry et al.), cf. in particular Example VII and FIG. 1, discloses a process and an apparatus for removing undesired ingredients, such as citric acid, from materials based on water, such as citrus juice. According to the process, the juice is first separated by microfiltration into a retentate containing the dispersed, substantially solid pulp substances of the juice, and a depulped permeate. Subsequently, the depulped permeate is subjected to an electrodialysis, whereby the citric acid is removed without change of the water content of the permeate. The resulting deacidified and depulped permeate is carried to an intermediary tank in which it is remixed with the pulp-containing retentate from the microfiltration, whereby it is possible to remove reproduced, deacidified citrus juice from the intermediary tank.

In order to ensure a possibility of regulating the product flows in such a manner that the microfiltration and the electroanalysis can be carried out in an optimum manner, the apparatus known from EP 460 339 has in a manner known per se been provided with a recirculation pipe carrying the material from the intermediary tank back to the feed side of the microfiltration unit. The returning of the deacidified permeate fraction is, however, not carried out directly, but not until said permeate fraction has been mixed with the retentate, whereby the weight ratio of the dispersing pulp phase to the continuous phase is almost identical with the weight ratio in the original, nontreated citrus juice. Due to the fact that the deacidified permeate fraction is not a fraction of the permeate having increased content of permeable solids it is not possible to obtain a retentate with a high content of solids and an increased content of permeable solids.

DE Offenlegungsschrift No. 36 26 498 (Roiner) discloses a process for preventing a coating or fouling of an ultrafiltration membrane by returning the retentate to the feed side prior to the actual concentration and in addition by subjecting the permeate to a desalting and/or pH-adjustment by way of ion exchange, electrolysis or dialysis in such a manner that a portion of the permeate flow is also returned to the feed side of the UF membrane. By being mixed with the retentate, the desalted or pH-adjusted permeate ensures that the proteins contained therein provide a reduced tendency to fouling. When the conductivity of the mixed phase has dropped below a predetermined value, the concentration of the feed dispersion by way of ultrafiltration can be carried out with a reduced fouling and consequently an increased filtration capacity. The DE Offenlegungsschrift does not suggest a returning of a concentrated fraction of the permeate to the feed dispersion. On the contrary the returned permeate has only been desalted and/or pH-adjusted and cannot thus be considered a concentrated fraction of the permeate with an increased concentration of permeable solids.

Thus none of the above publications provide the person skilled in the art with a guideline for meeting the above demand for a process and a system ensuring both a commercially acceptable filtration capacity and that relatively low-molecular compounds or at least a portion thereof can be maintained in the retentate.

BRIEF DESCRIPTION OF THE INVENTION

A demand still exists for a way of increasing the content of permeable solids in a retentate resulting from a membrane filtration. This object has been obtained by the system and the process according to the invention.

The system according to the invention for membrane filtration of a dispersion having an aqueous continuous phase comprises one or more membrane filtration units, also called primary membrane filtration units, where each unit is associated with a feeding pipe, a retentate exit pipe, and a permeate exit pipe, said retentate exit pipe of one unit, if desired, being coupled to or being the only inlet to the feeding pipe of one or more succeeding units, and is characterized in that one or more of the permeate exit pipes ($8^{n-1}$, $8^n$, $8^{n+1}$, ...) are coupled to one or more concentrating units ($10^{n-1}$, $10^n$, $10^{n+1}$, ...) adapted to separate the permeate into a diluted fraction and a concentrate, each concentrating unit being provided with an exit ($12^{n-1}$, $12^n$, $12^{n+1}$, ...) for the diluted fraction and a concentration exit pipe ($14^{n-1}$, $14^n$, $14^{n+1}$, ...) for the concentrate, said concentration exit pipe being coupled to a return pipe ($16^{n-1}$, $16^n$, $16^{n-1}$, ...) opening on to one or more of the feeding pipes ($2^{n-1}$, $2^n$, $2^{n+1}$, ...) of the membrane filtration units.

The return pipe may advantageously be coupled to one or more feeding pipes of the associated membrane filtration unit ($4^n$) and/or one or more of the preceding membrane filtration units (... $4^{n-2}$, $4^{n-1}$).

According to an advantageous embodiment of the system according to the invention, said system may comprise one or more groups of intercoupled concentrating units coupled to a common return pipe.

Such groups may include concentration units coupled in series, where the concentrate exit pipe of a first concentrating unit is coupled to a succeeding second concentrating unit.

According to an alternative embodiment, the system may as concentrating unit comprise a first membrane unit and a second membrane unit of a pore size being smaller than the pore size of the first membrane unit, and by the permeate exit pipe of the first membrane unit being coupled to the second membrane unit. In such a system, a permeable solid matter of an average molecular weight in the permeate from the first membrane unit can be removed from the retentate resulting from the first membrane filtration, while a relatively low-molecular permeable solid matter is returned to the first membrane unit in such a manner that the content of such a relatively low-molecular permeable solid matter is increased in the first retentate.

In the system according to the invention, the membrane filtration system may advantageously be a microfiltration unit or an ultrafiltration unit.

In the system according to the invention, the concentrating unit may advantageously be a centrifugal unit, an evaporation unit or a secondary membrane filtration unit or a combination thereof.

According to an advantageous embodiment of the system, the concentrating unit is a secondary membrane filtration unit, which comprises a membrane, called a secondary membrane, of a smaller pore size than the membrane, called a primary membrane, provided in the primary membrane filtration unit (4).

Figure 3:
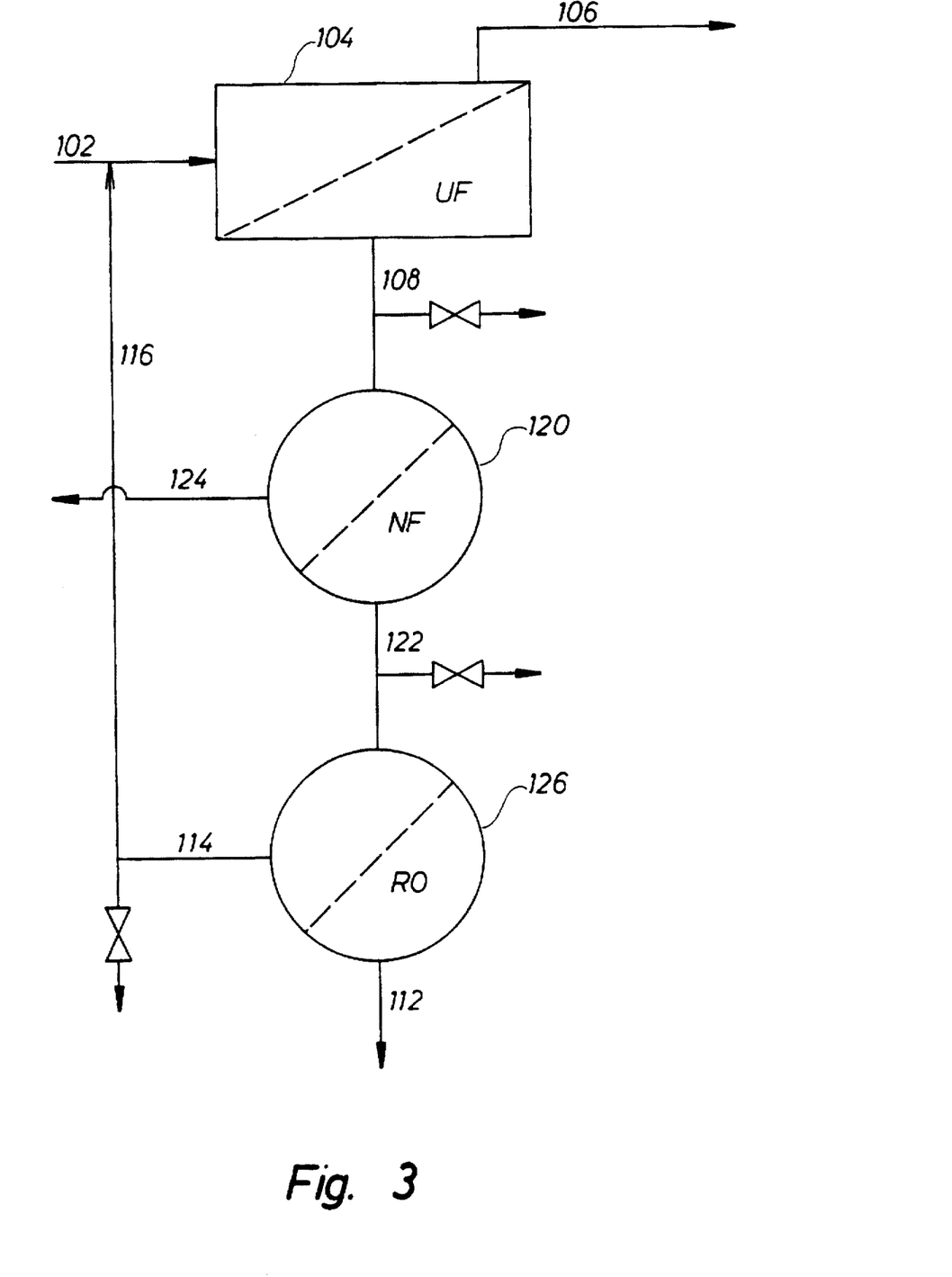
FIG. 3 illustrates a basic unit of a particular embodiment, where the membrane filtration unit is an ultrafiltration unit, and where the concentration unit comprises a nanofiltration unit and an RO-unit.

According to a further advantageous embodiment of the system according to the invention, the primary membrane filtration unit is an ultrafiltration unit, and the concentrating unit comprises a nanofiltration unit (120) with a retentate exit pipe (124) for the retentate and a permeate exit pipe (122) for the permeate, where the permeate exit pipe (122) is coupled to an RO-unit (126) provided with a permeate exit pipe (112) and a retentate exit pipe (114), and where the retentate exit pipe (114) is coupled to the return pipe (116) opening on to one or more of the feeding pipes ($2^{n-1}$, $2^n$, $2^{\pm 1}$, 102) of the primary membrane units.

The process according to the invention for membrane filtrating a dispersion having an aqueous continuous phase in one or more membrane filtration steps, where a feeding dispersion fed to a filtration membrane is separated in each step into a retentate retained by the filtration membrane and a permeate passing through said filtration membrane, whereby the retentate from one step can be used, if desired, as a feeding dispersion or a portion thereof in one or more succeeding steps, is characterized by subjecting the permeate resulting from one or more steps to a concentration to form a concentrated fraction containing an increased concentration of the dry matter or a portion thereof present in the permeate, and by the concentrated fraction being returned as a portion of the feeding dispersion in one or more membrane filtration steps.

Such a concentration may advantageously be carried out by way of centrifuging, evaporation or membrane filtration or by a combination of several of said concentrating methods.

When the concentration is carried out by way of membrane filtration, a secondary membrane is advantageously used, said secondary membrane having a smaller pore size than the pore size of the primary filtration membrane used for membrane filtrating the feeding dispersion.

When the primary membrane is an ultrafiltration membrane, the concentration may advantageously be carried out by way of one or more secondary membrane filtrations while using one or more NF-membranes, RO-membranes or a combination thereof. Such a combination allows a selective concentration of desired permeable solids.

By the process according to the invention, the dispersion used as starting material may advantageously be a fatty and protein-containing dispersion to be used within the food industry.

The process according to the invention may advantageously be carried out by way of diafiltration. As a result, it is for instance possible to reduce the amount of undesired permeable solids in the retentate, the permeate being subjected to a selective concentration and returning of particularly selected permeable solids desired in the retentate.

According to a particular embodiment, the concentration may thus be carried out by way of a combination of a nanofiltration membrane and an RO-membrane, the permeate of the nanofiltration membrane being used as feed dispersion for the RO-membrane, and by the concentrate resulting from the RO-membrane being returned to the feed dispersion for the primary membrane filtration by way of ultrafiltration.

It is possible by means of the system according to the invention to obtain an economical profit by enriching the content of solids with permeate ingredients as the solid ingredients following the permeate are usually rather inexpensive relative to the fat and the protein substances. An increase of the content of lactose and/or the mineral content in the retentate renders it possible to affect the properties of the product, such as the consistency and the taste, so as to be a more creamy sweet product, said properties being preferred in specific product types.

An important advantage gained by using the system according to the invention is that foreign substances are not added to the product, because the concentrated permeate contains exactly the substances deriving from the feed material used as starting material. This advantage makes the process according to the invention particularly attractive in connection with treatment of articles of food.

In a specific embodiment of the invention the object is to provide a process for regulating milk solids components in concentrated milk products in connection with their manufacture by ultrafiltration of milk, making it possible to regulate the percentage of the individual solids components individually, in particular the content of protein and lactose with respect to total solids and fat content. This enables direct manufacture of a very great variety of cheese products having very different organoleptic properties. Further, it generally involves better utilization of the solids components of the milk, and it also makes it possible to regulate the consistency of the final cheese product, since more lactose with respect to protein generally gives a more spreadable product. A special advantage of the invention is that the regulation can be performed in line in the manufacture of cheese so that no foreign ingredients are added to the cheese. Finally, the process of the invention entails that the excess products (permeates) are either so clean that they can be discharged directly without environmental problems, or so concentrated that they can be sold as they are for use in feeds or for production of lactose powder.

This is achieved by an embodiment of the process of the invention which is characterized in that the permeate from a first step of the ultrafiltration, optionally together with a portion of the permeate from a second step of the ultrafiltration, is subjected to hyperfiltration or nanofiltration or evaporation, and a portion of or the entire concentrate obtained is introduced into the second step of the ultrafiltration which is carried out to the desired solids content.

Whole milk is pretreated by separation and pasteurization. For certain products the fat portion is homogenized as a cream. Optionally, all the milk may be homogenized. Also, the fat content may be reduced by separating cream, or be increased by addition of cream.

Ultrafiltration is employed for concentrating the fat and protein of the milk. The ultrafiltration is generally performed at a temperature in the range of 40°–60° C. to a solids concentration of 18–50%.

In the process according to this embodiment of the invention the ultrafiltration is carried out in at least two steps. Both step 1 and step 2 of the ultrafiltration normally comprise several ultrafiltration modules. The permeate from UF step 1 is concentrated by hyperfiltration, nanofiltration or evaporation, in line or batchwise. To adjust protein and lactose, the concentrated retentate from the HF/NF system is added in the part of the ultrafiltration system having the greatest concentration of S, i.e. UF step 2. The effect of this is that a larger water soluble solids content, primarily lactose, enters into the product. The use of hyperfiltration or evaporation increases the lactose content as well as the content of salts and ash components. The use of nanofiltration increases the lactose content alone, while the ash and salt content is reduced.

When hyperfiltration is used, the UF 1 permeate is cooled from the ultrafiltration temperature 40°–60° C. to approximately 30° C. pH is adjusted to 5.9–6.1 prior to the introduction into the HF system. The working pressure is adjusted on the retentate valve to max. 3 MPa.

Depending on the adjustment, the solids content is increased during the concentrating from the introduction value 5.7–10% to the maximum value at the adjusted pressure. Any variation between 10 and 22% S may be selected, as desired. The preferred solids content in the retentate from the hyperfiltration is 15–19%.

In nanofiltration, a varied temperature may be used, depending upon the type of the nanofiltration system. It is the type of system and membrane that decides the working temperature. The variations are in the range of 20°–60° C., and solids concentrations of 10–40% may generally be obtained at these temperatures.

When evaporation is used, the permeate from UF step 1 is conveyed at the ultrafiltration temperature 40°–60° C. to an evaporator for concentration to the desired final solids content, which may be 10–50%, preferably 20–40%.

Regulation of the solids components of the milk may be effected individually for each solids component. The following milk solids components are involved: fat, protein, lactose, ash and salt.

The membrane(s) used in the system according to the invention as well as by the process according to the invention for the concentration of the permeate or a portion thereof is/are below called secondary membranes or membrane type II or merely membrane II in order to distinguish these membranes from the membrane receiving the feed dispersion, said membrane in the present specification also being called a primary membrane or membrane type I or merely membrane I.

The scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to persons skilled in the art from the detailed description.

DETAILED DESCRIPTION OF THE INVENTION

The present invention is based on the principle that some of the solid matter ingredients passing through the primary membrane in form of a permeate are concentrated by centrifuging, evaporation or by membrane filtration on a secondary membrane being tighter than the primary membrane, and in such a manner that a concentrated fraction of the permeate can be returned to the primary membrane unit. In this manner it is possible to increase and regulate the content of solid matter ingredients in the retentate, even when a primary membrane is used which is of a pore size usually causing portions of the solid matter ingredients to enter the permeate.

DETAILED DESCRIPTION

Figure 1:
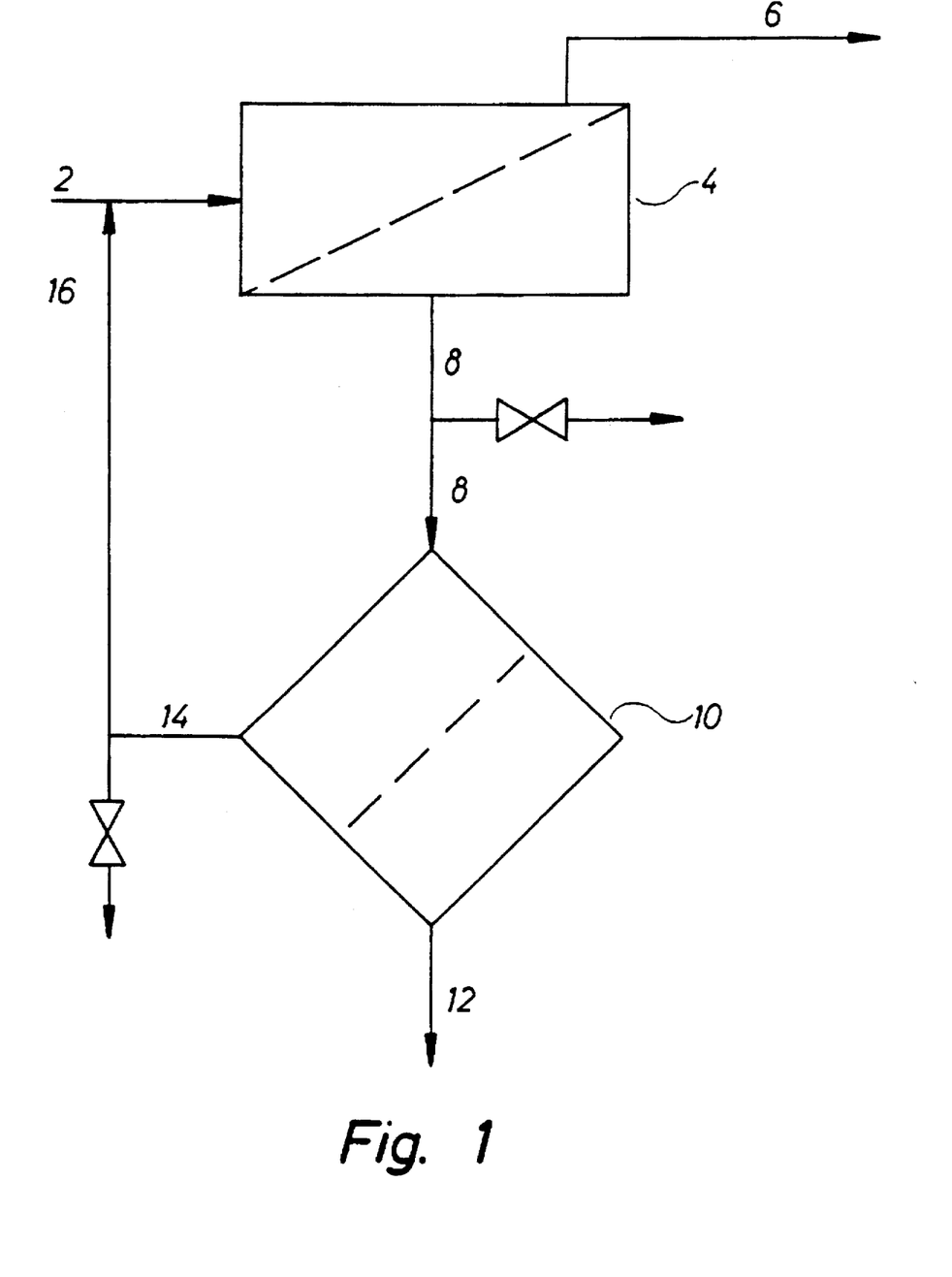
FIG. 1 illustrates the basic principle of the system according to the invention comprising a single membrane filtration unit and the associated concentration unit.

The basic principle of the invention appears from FIG. 1, where the material to be membrane filtered is introduced through a feed pipe 2 to a membrane filtration unit 4, in which a separation is carried out into a retentate leaving through a retentate exit pipe 6, and a permeate leaving through a permeate exit pipe 8. The permeate exit pipe is connected to a concentration unit 10, in which a separation is carried out into a diluted fraction discharged at 12, and a concentrate removed through a concentrate exit pipe 14. The concentration process can be carried out in any conventional manner, such as by way of centrifuging or evaporation, where the "diluted fraction" discharged at 12 is water steam being evaporated, or membrane filtration, which can be carried out by means of one or more membrane filtration units of the same type or different types. The concentrate or a portion thereof removed through the concentrate exit pipe 14 is carried by means of a return pipe 16 to the feed pipe 2 before the membrane filtration unit, where said concentrate is mixed with the introduced feed material.

Figure 2:
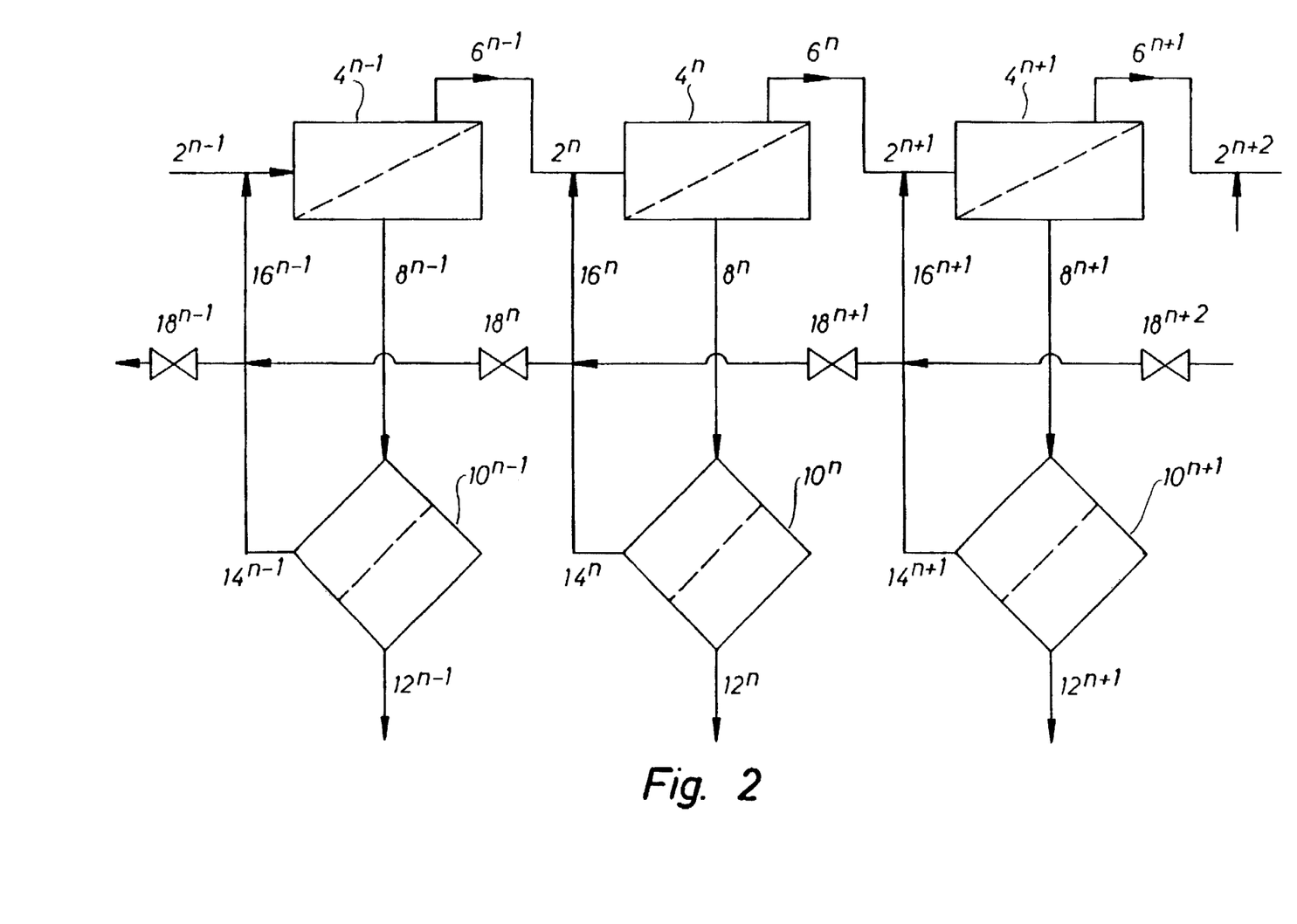
FIG. 2 illustrates an intercoupling of several of the basic units shown in FIG. 1.

The basic principle shown in FIG. 1 has been further developed in FIG. 2, in which a membrane filtration is performed in a manner known per se by means of several membrane units coupled in series. Thus the feed dispersion is fed through a feed pipe $2^{n-1}$ to a membrane filtration unit $4^{n-1}$, where a permeate $8^{n-1}$ and a retentate $6^{n-1}$ are formed. The retentate $6^{n-1}$ is carried through a feed pipe $2^n$ to the succeeding membrane filtration unit $4^n$, where a separation is again performed into a permeate $8^n$ and a retentate $6^n$, which in turn are carried to the succeeding membrane filtration unit $4^{n+1}$ etc. Thus each membrane filtration unit $4^n$ is provided with a permeate exit pipe $8^n$ coupled to a concentration unit $10^n$ with a permeate exit pipe $12^n$ and a concentrate exit pipe $14^n$ which can be returned through a return pipe $16^n$ to the feed pipe $2^n$ of the same membrane filtration unit $4^n$. The concentrate can, however, also be returned through one or more pipes $18^n$, $18^{n-1}$ . . . to one or more of the preceding membrane filtration units $4^{n-1}$, $4^{n-2}$ . . .

FIG. 3 illustrates a particular embodiment of the system according to the invention where the feed dispersion is introduced through a feed pipe 102 to an ultrafiltration unit 104 while forming a retentate drained off through a retentate exit pipe 106 and a permeate drained off through a permeate exit pipe 108. The permeate or a portion thereof is carried to a nanofiltration unit 120 while forming a retentate drained off through a retentate exit pipe 124. In addition, a permeate is formed which is drained off through a permeate exit pipe 122. The permeate from the nanofiltration unit 120 or a portion thereof is carried to an RO-unit 126 provided with a permeate exit pipe 112 and a retentate exit pipe 114. The retentate from the RO-unit or a portion thereof is returned through a return pipe 116 to the feed dispersion feed pipe 102. When such a system unit is used, the solids capable of passing through the ultrafiltration membrane, but not the nanofiltration membrane can be removed, while desired solids capable of passing through the nanofiltration membrane, but not through the RO-membrane can be concentrated and returned to the ultrafiltration unit. The unit shown in FIG. 3 can, of course, be coupled to several corresponding units in the same manner as shown for the unit in FIG. 1 coupled in series as shown in FIG. 2.

Figure 4:
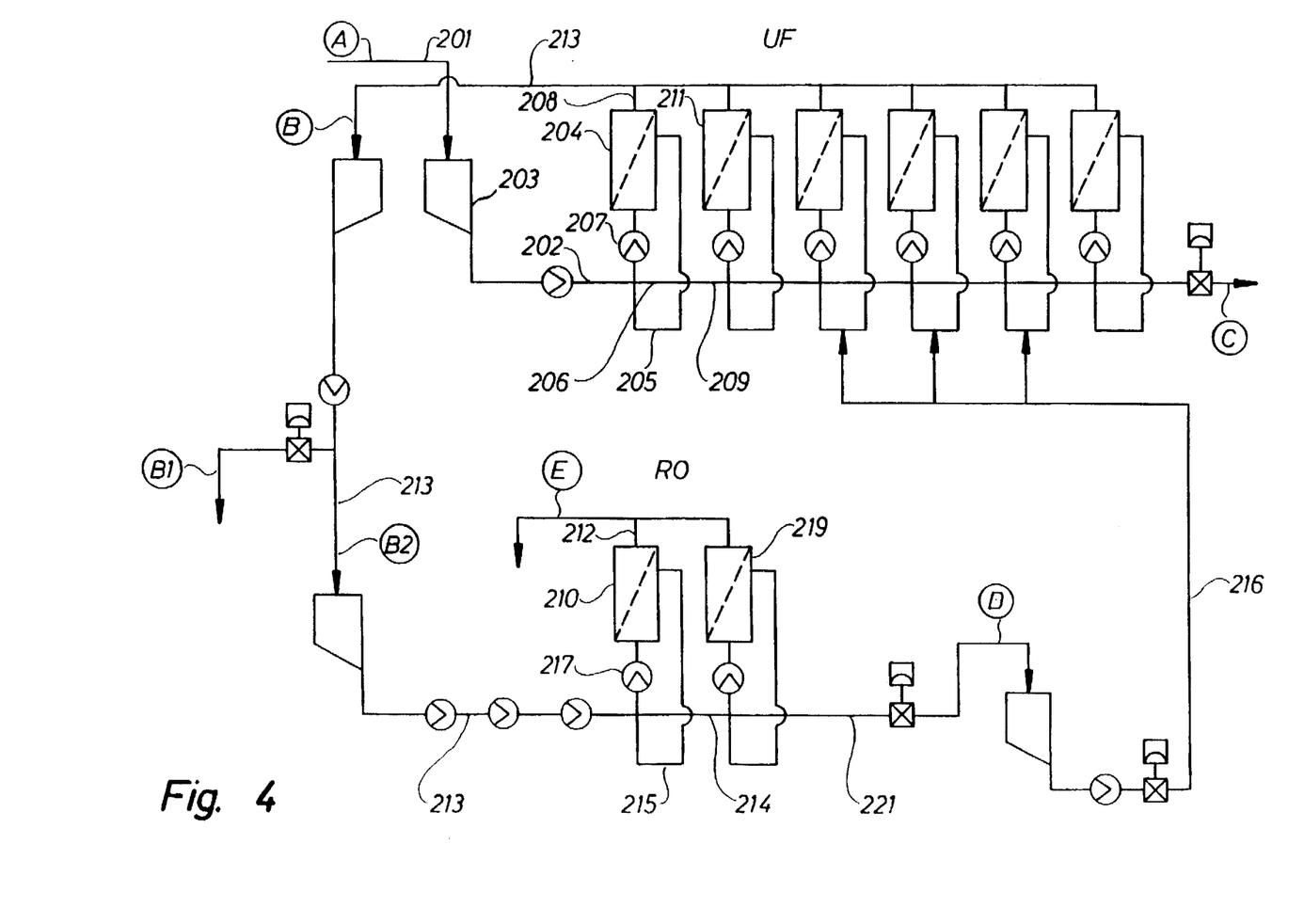
FIG. 4 illustrates an embodiment of the system according to the invention including a plurality of ultrafiltration units coupled in series and two RO-units as concentration units, where the flows of permeate from the individual ultrafiltration units together are carried to the RO-units, and where the total amount of concentrated permeate is returned and distributed over suitably selected ultrafiltration units of the units coupled in series.

A practical embodiment of the system according to the invention is shown in FIG. 4. By this embodiment, a plurality of ultrafiltration units are coupled in series (UF), and the concentration units are here formed by two RO-units (RO) coupled in series. The system comprises an inlet 201 for the starting material to be filtered, such as milk, said inlet being coupled via a vessel 203 to a feed pipe 202 to a first ultrafiltration unit 204. The ultrafiltration unit 204 is in a manner known per se provided with a recirculation circuit 205 on the feed/retentate side, said recirculation circuit 205 comprising a pump 207 ensuring the necessary filtering pressure, as well as a retentate exit pipe 206 coupled to a feed pipe 209 to the succeeding ultrafiltration unit 211. As illustrated in FIG. 4, the ultrafiltration unit 211 and the succeeding ultrafiltration units are designed in the same manner as the ultrafiltration unit 204, as all said units are provided with corresponding recirculation circuits with pump and retentate exit pipe.

A permeate exit pipe 208 of the first ultrafiltration unit 204 is together with the permeate exit pipes of the remaining ultrafiltration units coupled to a common permeate pipe 213 in turn coupled to a first RO-unit 210. Like the ultrafiltration units, the first RO-unit 210 is provided in a conventional manner with a recirculation circuit 215 with a pump 217 and a concentrate exit pipe 214, here an RO-retentate pipe, as well as an exit 212 for a diluted fraction, here RO-permeate. The concentrate exit pipe is coupled to a succeeding RO-unit 219 designed in the same manner as the RO-unit 210. A concentrate exit pipe 221 from the RO-unit 219 is coupled to a return pipe 216 in turn coupled to one or more of the recirculation circuits of the ultrafiltration units. In the embodiment shown in FIG. 4, the return pipe 216 is coupled to the third, the fourth, and the fifth ultrafiltration unit in a series of six ultrafiltration units. The ultrafiltration membrane of the ultrafiltration unit is typically of a molecular cutoff value of between 10 000 and 20 000M.

FIG. 4 also shows the following material flows:
(A): starting material in form of a dispersion with an aqueous continuous phase.
(B): UF-permeate.
(B1): Excess permeate.
(B2): UF-permeate to RO.
(C): UF-retentate.
(D): RO-retentate.
(E): RO-permeate.

In the embodiment where the concentration is carried out by way of membrane filtration, the process can be performed as shown in FIG. 1, the membrane filtration unit 4 being membrane type I and the concentration unit 10 being membrane type II. In this embodiment, a feed material is fed as feed dispersion to a membrane of the type I, such as an ultrafiltration membrane while forming a retentate and a permeate I. A large or small portion of the permeate I can then be subjected to a further membrane filtration on a membrane of membrane type II, i.e. for instance an NF-membrane, an RO-membrane or a UF-membrane of a smaller pore size than membrane I. As a result a permeate II is formed, and a concentrate is formed as retentate. The concentrate or a portion thereof can be returned so as to be mixed into the fed feed dispersion, whereby the resulting retentate is enriched with substances from the concentrated permeate.

Several parameters can be used for obtaining the desired composition of the retentate. Thus the entire amount of the concentrated permeate or only portions thereof can be returned. It is also possible to carry out a concentration of the permeate in one or more steps. By using a multi-stepped concentration of the permeate, it is also possible to use various types of membranes of their respective pore size. Such a fractioning in several steps can, of course, be carried out both during a posttreatment of the initially formed concentrate or during a posttreatment of the initially formed permeate.

Examples of such processes are for instance:

The permeate resulting from ultrafiltration is subjected to reverse osmosis (RO), and the RO-concentrate or a portion thereof is returned to the UF-system.

The permeate resulting from the ultrafiltration is subjected to a nanofiltration (NF), and the NF-concentrate or a portion thereof is returned to the UF-system.

The permeate resulting from the ultrafiltration is subjected to an NF-filtration, and the NF-permeate is then subjected to an RO-filtration, whereafter the RO-concentrate or a portion thereof is returned to the UF-system.

It appears that by a suitable selection of the concentration unit, such as by the selection of membrane sizes, in a selective and regulated manner it is possible to return desired substances to the primary membrane filtration unit, and thereby to obtain an increased and controlled concentration of these substances in the obtained retentate.

The returning of a desired fraction of the permeate concentrate renders it possible to develop many interesting product improvements and new products. Thus the use of the system according to the invention for treatment of milk products based on a suitable fractioning renders it possible to increase and regulate the content of lactose in the retentate without thereby involving an increase in the retentate of monovalent salts to a significant degree. On the other hand it is also possible to increase the content of monovalent salts without increasing the content of lactose. The latter can thus be obtained by combining an NF-membrane and an RO-membrane unit, where the lactose is retained in the NF-retentate and where the NF-permeate containing monovalent salts is returned to the RO-unit so as there to be returned in form of retentate to the primary membrane filtration unit.

The content of lactose and minerals in the resulting retentate has a high effect on many important properties of the finished product, such as taste, consistency, gelling capacity, heat stability, colour etc., and accordingly a great demand exists for the possibility of regulating the concentrations of such ingredients.

It is, of course, an advantage that it is possible to maintain the content of solids in the retentate using a product which was previously considered a by-product, as it is possible to obtain a high yield with respect to weight and to reduce the amount of by-products which are difficult to dispose.

The system and the process according to the invention have been developed in connection with ultrafiltration of milk or milk products. It is, however, possible as feed dispersion to use any dispersion having an aqueous continuous phase. In addition to milk and milk products, blood and waste water can be mentioned as examples of such dispersions.

Figure 5:
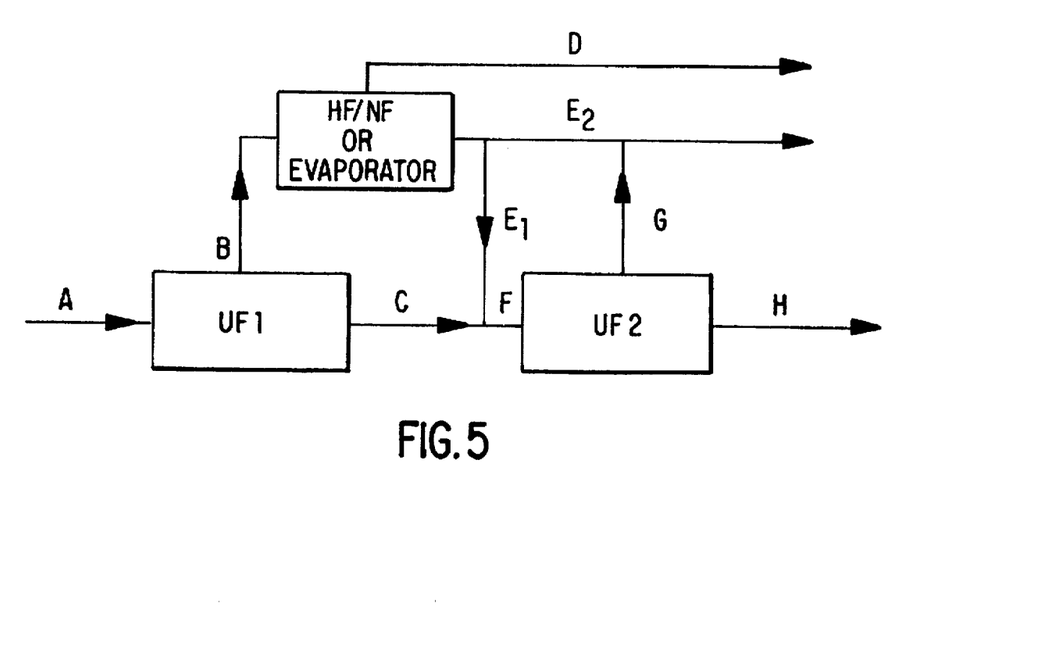
FIG. 5 is a flow diagram illustrating an embodiment of the process according to the invention as defined in claim 18.
Figure 6:
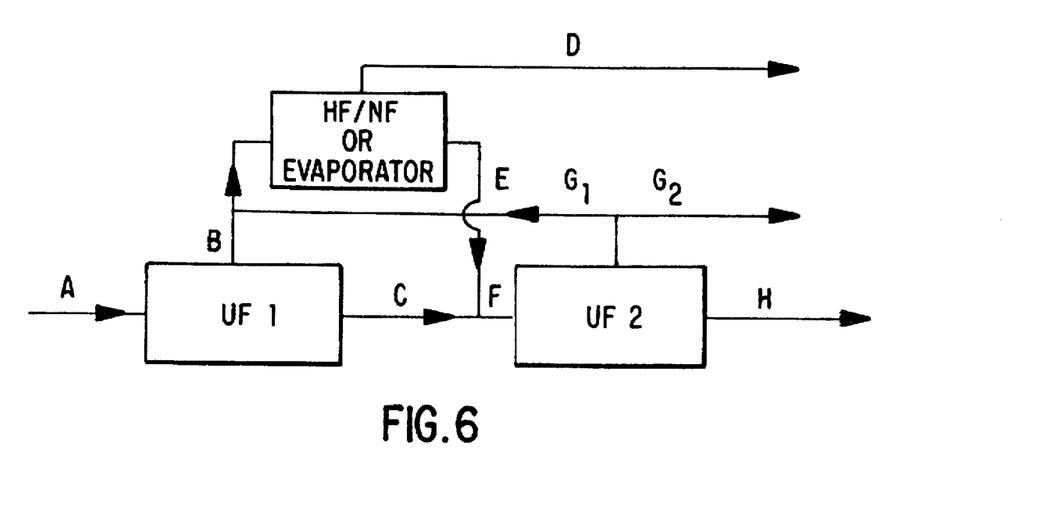
FIG. 6 is a flow diagram illustrating an embodiment of the process according to the invention as defined in claim 19.

The various possible combinations in the specific embodiment of the invention relating to a process for regulating milk solids components in concentrated milk products are illustrated more fully by the following flow diagrams with reference to FIGS. 5 and 6 on the accompanying drawings.

| Flow diagram FIG. 5 | |
|---|---|
| Milk treatment | Centrifugation. Optional cream homogenization. Pasteurization 72–75° C./15 s. |
| Ultrafiltration step 1 | Temperature 40–55° C. Permeate B, 5.7–10% S. Retentate C, 15–35% S. |
| Hyper/nanofiltration or evaporation | Permeate B from UF step 1 is concentrated to desired solids. Permeate D for discharge. Retentate/concentrate $E_1 + E_2$, 10–20% S by hyperfiltration, 10–40% S by nanofiltration and 10–50% S by evaporation. |
| Ultrafiltration step 2 | Part of the retentate/concentrate $E_1$ from HF/NF or evaporation is conveyed together with the retentate C from UF step 1, and the mixture F is introduced into UF step 2 and concentrated to 25–50% S in the retentate H. The permeate G is conveyed together with excess retentate/concentrate $E_2$, and the mixture can be sold as a feed or be used for the production of lactose powder. |
| Flow diagram FIG. 6 | |
| Milk treatment | Part of the retentate/concentrate $E_1$ from HF/NF or evaporation is conveyed together with the retentate C from UF step 1, and the mixture F is introduced into UF step 2 and concentrated to 25–50% S in the retentate H. The permeate G is conveyed together with excess retentate/concentrate $E_2$, and the mixture can be sold as a feed or be used for the production of lactose powder. |
| Ultrafiltration step 1 | Part of the retentate/concentrate $E_1$ from HF/NF or evaporation is conveyed together with the retentate C from UF step 1, and the mixture F is introduced into UF step 2 and concentrated to 25–50% |

| | |
|---|---|
| | S in the retentate H. The permeate G is conveyed together with excess retentate/concentrate $E_2$, and the mixture can be sold as a feed or be used for the production of lactose powder. |
| Hyper/nanofiltration or evaporation | Permeate B from UF step 1 is conveyed together with a recycled portion of permeate G, from UF step 2 and is concentrated to desired S. Permeate D for discharge. Retentate/concentrate E same S as above. |
| Ultrafiltration step 2 | The retentate/concentrate E from HF/NF or evaporation is conveyed together with retentate C from UF step 1, and the mixture F is introduced into UF step 2 and concentrated to 25–50% S in the retentate H. Part of the permeate G, is recycled for HF/NF or evaporation; the residue G2 can be sold as a feed or be used for the production of lactose powder. |

Danish cow's milk contains the following solids ingredients on an average:

| | |
|---|---|
| Protein | 3.40%, of which NPN 0.25%, real protein 3.15% |
| Lactose | 4.70% |
| Acid | 0.30% |
| Ash | 0.63% |
| Fat | 4.20% |

If a low fat content in the concentrated milk product is desired, the fat content of the milk is lowered by removing part of the cream by separation. In the ultrafiltration all the fat is retained in the retentate, while protein is retained with more than 90% depending upon membrane density. Thus, the protein/fat ratio in the concentrated milk product is adjusted by the fat percentage.

Depending upon the desired final S in the product, S is selected in UF. Between 25 and 31% S in the UF 1 retentate C is chosen in most of the following examples. In a couple of cases with a final S in the retentate H from UF 2 of 30% (examples 5 and 9), 16% S is chosen in the retentate C from UF 1.

The parameter most frequently used for adjusting lactose in the product is the amount of retentate/concentrate $E_1$ which is added to UF 2, combined with S in the retentate C from UF 1, compared with the final S in the retentate H from UF 2. A lower S in the UF 1 retentate C and/or a larger amount of E, and/or a higher S in $E_1$ results in an increased lactose percentage in the final product. A lower S percentage in the retentate from UF 1 necessitates a greater system capacity of the HF/NF/evaporation system. The above parameters are therefore selected on the basis of the most economical operation with respect to system size, membrane area and energy consumption.

The system and the process of the invention will be illustrated more fully by the following working examples with reference to the drawings.

EXAMPLE 1

The present example illustrates the use of a system as shown in FIG. 4 for ultrafiltration of milk. The used ultrafiltration membranes have a molecular cutoff value of approximately 15 000M. In the Table shown below the weight ratios are stated in kg/h for the individual materials, the solid content (S) in % by weight, and the content of the most important ingredients are stated in % by weight relative to the total amount of solids. The Table shows both the composition by means of the system according to the invention and by means of a corresponding conventional ultrafiltration system structured in the same manner as shown in FIG. 4, but without the concentration and returning of a concentrate with an increased concentration of permeable dry substances.

TABLE

Ultrafiltration of milk

| | | Composition (% by weight) | |
|---|---|---|---|
| Material | Amount (kg/h) | System according to the invention | Convent system |
| (A) Milk | 10,000 | TS: 13.5% Fat: 4.6% Protein: 3.4% Lactose: 4.6% | TS: 12.5% Fat: 3.6% Protein: 3.4% Lactose: 4.6% |
| (B) UF-permeate | 9,222 | TS: 7.3% Fat: 0.0% Protein: 0.3% Lactose: 6.2% | TS: 5.8% Fat: 0.0% Protein: 0.2% Lactose: 4.9% |
| (B1) Excess permeate | 4,430 | As (B) | |
| (B2) permeate to RO | 4,792 | As (B) | |
| (C) UF-retentate | 2,594 | TS: 39.5% Fat: 17.7% Protein: 12.7% Lactose: 7.0% | TS: 39.5% Fat: 17.7% Protein: 16.3% Lactose: 3.4% |
| (D) RO-retentate | 1,816 | TS: 19.0% Fat: 0.0% Protein: 0.6% Lactose: 16.3% | |
| (E) RO-permeate | 2,976 | TS: 0.1% | |

It appears that it is possible produce a UF-retentate having a desired content of solids and fat, here 39.5% by weight and 17.7% by weight, respectively, with a content of only 12.7% by weight of protein representing the most expensive ingredient by means of the system according to the invention. On the other hand 16.3% by weight of protein are necessary for the production of a UF-permeate containing 39.5% by weight of solids and 17.7% by weight of fat when a conventional ultrafiltration system without a returning of permeable solids is used.

EXAMPLE 2

Regulation of solids composition by concentrating whole milk to a product which is useful for the manufacture of fresh soft spreadable cheese having a low fat content.

| Desired Properties | |
|---|---|
| Solids, % | Approx. 30 |
| Fat in solids, incl. 1.20% salt, % | Approx. 35 |
| Protein, % | Approx. 11 |
| Lactose, % | Approx. 7 |

The procedure proceeds according to the flow diagram in FIG. 5, the fat content in the starting milk being reduced to 3.25% by separation of cream, the ultrafiltration in step 1 being run to a solids content of 27% in the retentate C, and 20% HF retentate $E_2$ being added to the retentate C from UF 1, the residue $E_2$ of the HF retentate being conveyed together with the permeate G from UF 2 to provide a mixture that can be sold as a feed or be used for the production of lactose powder. This procedure results in the following amounts and compositions of the various process flows:

| | UF step 1 | | | | |
|---|---|---|---|---|---|
| | Whole | | | HF | |
| | milk A | Permeate B | Retentate C | Permeate D | Retentate $E_1 + E_2$ |
| Amounts, 1 | 11000 | 7784.62 | 3215.38 | 5244.37 | 642.08 1897.17 |
| Protein, % | 3.15 | 0.01 | 10.75 | 0 | 0.03 |
| NPN, % | 0.25 | 0.23 | 0.30 | 0.06 | 0.46 |
| Lactose, % | 4.70 | 5.13 | 3.66 | 0.02 | 16.31 |
| Acid, % | 0.30 | 0.20 | 0.54 | 0 | 0.71 |
| Total ash, % | 0.63 | 0.63 | 0.63 | 0.01 | 1.49 |
| Fat, % | 3.25 | 0 | 11.12 | 0 | 0 |
| Solids, % | 12.28 | 6.20 | 27 | 0.09 | 19 |

| | UF step 2 | | |
|---|---|---|---|
| | Feed F | Permeate G | Retentate H |
| Amounts, % | 3858.46 | 643.08 | 3215.38 |
| Protein, % | 8.97 | 0.01 | 10.76 |
| NPN, % | 0.33 | 0.23 | 0.39 |
| Lactose, % | 5.77 | 7.88 | 6.92 |
| Acid, % | 0.57 | 0.30 | 0.68 |
| Total ash, % | 0.77 | 0.63 | 0.93 |
| Fat, % | 9.27 | 0 | 11.12 |
| Solids, % | 25.67 | 9.05 | 30.80 |

EXAMPLE 3

Regulation of solids composition by concentrating whole milk to a product which is useful for the manufacture of feta cheese in brine.

| Desired Properties: | |
|---|---|
| Solids, % | Approx. 40 |
| Fat in solids, incl. 3.50% salt, % | Approx. 40 |
| Protein, % | Approx. 11 |
| Lactose, % | Approx. 10 |

The procedure proceeds according to the flow diagram in FIG. 5, the ultrafiltration in step 1 being run to a solids content of 28% in the retentate C, 20% HF retentate $E_1$ being added to the retentate C from UF 1, the residue $E_2$ of the HF retentate being conveyed together with the permeate G from UF 2 to provide a mixture that can be sold as a feed or be used for the production of lactose powder. This procedure results in the following amounts and compositions of the various process flows.

| | UF step 1 | | | | |
|---|---|---|---|---|---|
| | Whole | | | HF | |
| | milk A | Permeate B | Retentate C | Permeate D | Retentate $E_1 + E_2$ |
| Amounts, 1 | 11000 | 6594.71 | 4405.29 | 4442.75 | 881.06 1270.90 |
| Protein, % | 3.15 | 0.01 | 7.85 | 0 | 0.03 |
| NPN, % | 0.25 | 0.23 | 0.28 | 0.06 | 0.46 |
| Lactose, % | 4.70 | 5.13 | 4.06 | 0.02 | 16.31 |

-continued

| Acid, % | 0.30 | 0.20 | 0.45 | 0 | 0.71 |
|---|---|---|---|---|---|
| Total ash, % | 0.63 | 0.63 | 0.63 | 0.01 | 1.49 |
| Fat, % | 5.50 | 0 | 13.75 | 0 | 0 |
| Solids, % | 14.53 | 6.20 | 27 | 0.09 | 19 |

| | UF step 2 | | |
|---|---|---|---|
| | Feed F | Permeate G | Retentate H |
| Amounts, 1 | 5286.35 | 1919.25 | 3367.10 |
| Protein, % | 6.55 | 0.01 | 10.28 |
| NPN, % | 0.31 | 0.23 | 0.49 |
| Lactose, % | 6.10 | 7.88 | 9.57 |
| Acid, % | 0.49 | 0.30 | 0.77 |
| Total ash, % | 0.77 | 0.63 | 1.21 |
| Fat, % | 11.44 | 0 | 17.97 |
| Solids, % | 25.67 | 9.05 | 40.30 |

EXAMPLE 4

Regulation of solids composition by concentrating whole milk to a product which is useful for the manufacture of feta cheese in brine.

| Desired Properties: | |
|---|---|
| Solids, % | Approx. 40 |
| Fat in solids, incl. 3.50% salt, % | Approx. 50 |
| Protein, % | Approx. 7 |
| Lactose, % | Approx. 8 |

The procedure proceeds according to the flow diagram in FIG. 5, the ultrafiltration in step 1 being run to a solids content of 30.12% in the retentate C, 20% HF retentate $E_1$ being added to the retentate C from UF 1, the residue $E_2$ of the HF retentate being conveyed together with the permeate G from UF 2 to provide a mixture that can be sold as a feed or be used for the production of lactose powder. This procedure results in the following amounts and compositions of the various process flows:

| | UF step 1 | | | | |
|---|---|---|---|---|---|
| | Whole | | | HF | |
| | milk A | Permeate B | Retentate C | Permeate D | Retentate $E_1 + E_2$ |
| Amounts, 1 | 11000 | 5099.92 | 5900.08 | 3435.73 | 1180.02 484.17 |
| Protein, % | 3.15 | 0.01 | 5.86 | 0 | 0.03 |
| NPN, % | 0.25 | 0.23 | 0.27 | 0.06 | 0.46 |
| Lactose, % | 4.70 | 5.13 | 4.33 | 0.02 | 16.31 |
| Acid, % | 0.30 | 0.20 | 0.39 | 0 | 0.71 |
| Total ash, % | 0.63 | 0.63 | 0.63 | 0.01 | 1.49 |
| Fat, % | 10 | 0 | 18.64 | 0 | 0 |
| Solids, % | 19.03 | 6.20 | 30.12 | 0.09 | 19 |

| | UF step 2 | | |
|---|---|---|---|
| | Feed F | Permeate G | Retentate H |
| Amounts, 1 | 7080.10 | 2022.89 | 5057.21 |
| Protein, % | 4.89 | 0.01 | 6.85 |
| NPN, % | 0.30 | 0.23 | 0.42 |
| Lactose, % | 6.33 | 7.88 | 8.86 |
| Acid, % | 0.44 | 0.30 | 0.62 |
| Total ash, % | 0.77 | 0.63 | 1.08 |

-continued

| | | | |
|---|---|---|---|
| Fat, % | 15.54 | 0 | 21.75 |
| Solids, % | 28.27 | 9.05 | 39.57 |

EXAMPLE 5

Regulation of solids composition by concentrating whole milk to a product which is useful for the manufacture of feta cheese in brine.

| Desired Properties: | |
|---|---|
| Solids, % | Approx. 42 |
| Fat in solids, incl. 3.50% salt, % | Approx. 45 |
| Protein, % | Approx. 10 |
| Lactose, % | Approx. 10 |

The procedure proceeds according to the flow diagram in FIG. 5, the fat content in the starting milk being increased to 6.90% by addition of cream, the ultrafiltration in the step 1 being run to a solids content of 28.58% in the retentate C, 20% HF retentate $E_1$ being added to the retentate C from UF 1, the residue $E_2$ of the HF retentate being conveyed together with the permeate G from UF 2 to provide a mixture that can be sold as a feed or be used for the production of lactose powder. This procedure results in the following amounts and compositions of the various process flows:

| | UF step 1 | | | | |
|---|---|---|---|---|---|
| | Whole | | | HF | |
| | milk A | Permeate B | Retentate C | Permeate D | Retentate $E_1 + E_2$ |
| Amounts, 1 | 11000 | 6217.39 | 4782.61 | 4188.56 | 956.52 |
| | | | | | 1072.31 |
| Protein, % | 3.15 | 0.01 | 7.23 | 0 | 0.03 |
| NPN, % | 0.25 | 0.23 | 0.28 | 0.06 | 0.46 |
| Lactose, % | 4.70 | 5.13 | 4.14 | 0.02 | 16.31 |
| Acid, % | 0.30 | 0.20 | 0.43 | 0 | 0.71 |
| Total ash, % | 0.63 | 0.63 | 0.63 | 0.01 | 1.49 |
| Fat, % | 6.90 | 0 | 15.87 | 0 | 0 |
| Solids, % | 15.93 | 6.20 | 28.58 | 0.09 | 19 |

| | UF step 2 | | |
|---|---|---|---|
| | Feed F | Permeate G | Retentate H |
| Amounts, 1 | 5739.13 | 2060.20 | 3678.93 |
| Protein, % | 6.03 | 0.01 | 9.41 |
| NPN, % | 0.31 | 0.23 | 0.48 |
| Lactose, % | 6.17 | 7.88 | 9.62 |
| Acid, % | 0.48 | 0.30 | 0.74 |
| Total ash, % | 0.77 | 0.63 | 1.21 |
| Fat, % | 13.23 | 0 | 20.63 |
| Solids, % | 26.98 | 9.05 | 42.09 |

EXAMPLE 6

Regulation of solids composition by concentrating whole milk to a product which is useful for the manufacture of light feta cheese in brine or spreadable cheese.

| Desired Properties: | |
|---|---|
| Solids, % | Approx. 30 |
| Fat in solids, incl. 2.50% salt, % | Approx. 20 |
| Protein, % | Approx. 10 |
| Lactose, % | Approx. 12 |

The procedure proceeds according to the flow diagram in FIG. 5, the fat content in the starting milk being reduced to 2.20% by separation of cream, the ultrafiltration in step 1 being run to a solids content of 16.26% in the retentate C, 20% HF retentate $E_1$ being added to the retentate C from UF 1, the residue $E_2$ of the HF retentate being conveyed together with the permeate G from UF 2 to provide a mixture that can be sold as a feed or be used for the production of lactose powder. This procedure results in the following amounts and compositions of the various process flows:

| | UF step 1 | | | | |
|---|---|---|---|---|---|
| | Whole | | | HF | |
| | milk A | Permeate B | Retentate C | Permeate D | Retentate $E_1 + E_2$ |
| Amounts, 1 | 11000 | 5500.00 | 5500.00 | 3705.26 | 1100.00 |
| | | | | | 694.74 |
| Protein, % | 3.15 | 0.01 | 6.29 | 0 | 0.03 |
| NPN, % | 0.25 | 0.23 | 0.27 | 0.06 | 0.46 |
| Lactose, % | 4.70 | 5.13 | 4.27 | 0.02 | 16.31 |
| Acid, % | 0.30 | 0.20 | 0.40 | 0 | 0.71 |
| Total ash, % | 0.63 | 0.63 | 0.63 | 0.01 | 1.49 |
| Fat, % | 2.20 | 0 | 4.40 | 0 | 0 |
| Solids, % | 11.23 | 6.20 | 16.26 | 0.09 | 19 |

| | UF step 2 | | |
|---|---|---|---|
| | Feed F | Permeate G | Retentate H |
| Amounts, 1 | 6600.00 | 3032.43 | 3567.57 |
| Protein, % | 5.25 | 0.01 | 9.71 |
| NPN, % | 0.30 | 0.23 | 0.56 |
| Lactose, % | 6.28 | 7.88 | 11.61 |
| Acid, % | 0.45 | 0.30 | 0.84 |
| Total ash, % | 0.77 | 0.63 | 1.43 |
| Fat, % | 3.67 | 0 | 6.78 |
| Solids, % | 16.72 | 9.05 | 30.93 |

EXAMPLE 7

Regulation of solids composition by concentrating whole milk to a product which is useful for the manufacture of feta cheese in brine.

| Desired Properties: | |
|---|---|
| Solids, % | Approx. 40 |
| Fat in solids, incl. 4.20% salt, % | Approx. 40 |
| Protein, % | Approx. 15 |
| Lactose, % | Approx. 6 |

The procedure proceeds according to the flow diagram in FIG. 5, the fat content in the starting milk being reduced to 4.00% by separation of cream, the ultrafiltration in step 1 being run to a solids content of 30.11% in the retentate C, 5% HF retentate $E_1$ being added to the retentate C from UF 1, the residue $E_2$ of the HF retentate being conveyed together with the permeate G from UF 2 to provide a mixture that can be sold as a feed or be used for the production of lactose powder. This procedure results in the following amounts and compositions of the various process flows:

| UF step 1 | | | | |
|---|---|---|---|---|
| Whole | | | HF | |
| milk A | Permeate B | Retentate C | Permeate D | Retentate $E_1 + E_2$ |
| Amounts, 1 | 11000 | 7857.14 | 3142.86 | 5293.23 | 157.14 2406.77 |
| Protein, % | 3.15 | 0.01 | 11.00 | 0 | 0.03 |
| NPN, % | 0.25 | 0.23 | 0.30 | 0.06 | 0.46 |
| Lactose, % | 4.70 | 5.13 | 3.63 | 0.02 | 16.31 |
| Acid, % | 0.30 | 0.20 | 0.55 | 0 | 0.71 |
| Total ash, % | 0.63 | 0.63 | 0.63 | 0.01 | 1.49 |
| Fat, % | 4.00 | 0 | 14.00 | 0 | 0 |
| Solids, % | 13.03 | 6.20 | 30.11 | 0.09 | 19.00 |

| UF step 2 | | | |
|---|---|---|---|
| | Feed F | Permeate G | Retentate H |
| Amounts, 1 | 3300.00 | 873.53 | 2426.47 |
| Protein, % | 10.48 | 0.01 | 14.25 |
| NPN, % | 0.31 | 0.23 | 0.42 |
| Lactose, % | 4.23 | 7.88 | 5.75 |
| Acid, % | 0.56 | 0.30 | 0.76 |
| Total ash, % | 0.67 | 0.63 | 0.91 |
| Fat, % | 13.33 | 0 | 18.13 |
| Solids, % | 29.58 | 9.05 | 40.22 |

EXAMPLE 8

Regulation of solids composition by concentrating whole milk to a product which is useful for the manufacture of feta cheese in brine.

| Desired Properties: | |
|---|---|
| Solids, % | Approx. 40 |
| Fat in solids, incl. 4.20% salt, % | Approx. 40 |
| Protein, % | Approx. 8 |
| Lactose, % | Approx. 12 |

The procedure proceeds according to the flow diagram in FIG. 6, the ultrafiltration step 1 being run to a solids content of 26.49% in the retentate C, 6% UF 2 permeate $G_1$ being added to the permeate B from UF 1 and 40% HF retentate E being added to the retentate C from UF 1, the residue $G_2$ of the permeate from UF 2 being recovered and being useful as a feed or for the production of lactose powder. This procedure results in the following amounts and compositions of the various process flows:

| UF step 1 | | | | |
|---|---|---|---|---|
| Whole | | | HF | |
| milk A | Permeate B | Retentate C | Permeate D | Retentate $E_1 + E_2$ |
| Amounts, 1 | 11000 | 5500.00 | 5500.00 | 3627.11 | 2200.00 |
| Protein, % | 3.15 | 0.01 | 6.29 | 0 | 0.03 |
| NPN, % | 0.25 | 0.23 | 0.27 | 0.06 | 0.46 |
| Lactose, % | 4.60 | 5.40 | 3.80 | 0.02 | 16.31 |
| Acid, % | 0.30 | 0.20 | 0.40 | 0 | 0.71 |
| Total ash, % | 0.63 | 0.63 | 0.63 | 0.01 | 1.49 |
| Fat, % | 7.55 | 0 | 15.10 | 0 | 0 |
| Solids, % | 16.48 | 6.47 | 26.49 | 0.09 | 19.00 |

| UF step 2 | | | |
|---|---|---|---|
| | Feed F | Permeate $G_1 + G_2$ | Retentate H |
| Amounts, 1 | 7700.00 | 327.11 2706.22 | 4666.67 |
| Protein, % | 4.50 | 0.01 | 7.43 |
| NPN, % | 0.32 | 0.23 | 0.54 |
| Lactose, % | 7.37 | 7.88 | 12.17 |
| Acid, % | 0.49 | 0.30 | 0.81 |
| Total ash, % | 0.88 | 0.63 | 1.44 |
| Fat, % | 10.79 | 0 | 17.80 |
| Solids, % | 24.35 | 9.05 | 40.18 |

EXAMPLE 9

Regulation of solids composition by concentrating whole milk to a product which is useful for the manufacture of feta cheese in brine.

| Desired Properties: | |
|---|---|
| Solids, % | Approx. 40 |
| Fat in solids, incl. 4.20% salt, % | Approx. 40 |
| Protein, % | Approx. 12 |
| Lactose, % | Approx. 8 |

The procedure proceeds according to the flow diagram in FIG. 6 with evaporation of the UF 1 permeate, the ultrafiltration in step 2 being run to a solids content of 20% in the retentate C, 20% evaporation concentrate $E_1$ being added to the retentate C from UF 1, the residue $E_2$ of the concentrate being conveyed together with the permeate G from UF 2 to provide a mixture that can be sold as a feed or be used for the production of lactose powder. This procedure results in the following amounts and compositions of the various process flows:

| UF step 1 | | | | |
|---|---|---|---|---|
| Whole | | | HF | |
| milk A | Permeate B | Retentate C | Permeate D | Retentate $E_1 + E_2$ |
| Amounts, 1 | 11000 | 7071.43 | 3928.57 | 4861.61 | 785.71 1424.11 |
| Protein, % | 3.15 | 0.01 | 8.80 | 0 | 0.03 |
| NPN, % | 0.25 | 0.23 | 0.29 | 0.02 | 0.67 |
| Lactose, % | 4.47 | 5.40 | 2.80 | 0 | 17.28 |
| Acid, % | 0.30 | 0.20 | 0.48 | 0 | 0.64 |
| Total ash, % | 0.63 | 0.63 | 0.63 | 0.01 | 1.98 |
| Fat, % | 4.90 | 0 | 13.72 | 0 | 0 |
| Solids, % | 13.70 | 6.47 | 26.71 | 0.03 | 20.61 |

| UF step 2 | | | |
|---|---|---|---|
| | Feed F | Permeate G | Retentate H |
| Amounts, 1 | 4714.29 | 1730.56 | 2983.73 |
| Protein, % | 7.34 | 0.01 | 11.60 |
| NPN, % | 0.35 | 0.23 | 0.55 |
| Lactose, % | 5.21 | 7.88 | 8.23 |
| Acid, % | 0.51 | 0.30 | 0.80 |
| Total ash, % | 0.86 | 0.63 | 1.35 |
| Fat, % | 11.43 | 0 | 18.06 |
| Solids, % | 25.70 | 9.05 | 40.60 |

EXAMPLE 10

Regulation of solids composition by concentrating whole milk to a product which is useful for the manufacture of light feta cheese in brine or spreadable cheese.

| Desired Properties: | |
|---|---|
| Solids, % | Approx. 30 |
| Fat in solids, incl. 2.50% salt, % | Approx. 20 |
| Protein, % | Approx. 10 |
| Lactose, % | Approx. 12 |

The procedure proceeds according to the flow diagram in FIG. 6, the ultrafiltration in step 1 being run to a solids content of 27% in the retentate C, 16.07% HF retentate $E_1$ being added to the retentate C from UF 1, the residue $E_2$ of the HF retentate being conveyed together with the permeate G from UF 2 to provide a mixture that can be sold as a feed or be used for the production of lactose powder. Working in this manner results in the following amounts and compositions of the various process flows:

| | UF step 1 | | | | |
|---|---|---|---|---|---|
| | Whole | | | HF | |
| | milk A | Permeate B | Retentate C | Permeate D | Retentate $E_1 + E_2$ |
| Amounts, 1 | 11000 | 5500.00 | 5500.00 | 3781.25 | 1485.00 233.75 |
| Protein, % | 3.15 | 0.01 | 6.29 | 0 | 0.03 |
| NPN, % | 0.25 | 0.23 | 0.27 | 0.02 | 0.67 |
| Lactose, % | 4.59 | 5.40 | 3.78 | 0 | 17.28 |
| Acid, % | 0.30 | 0.20 | 0.40 | 0 | 0.64 |
| Total ash, % | 0.63 | 0.63 | 0.63 | 0.01 | 1.98 |
| Fat, % | 2.25 | 0 | 4.70 | 0 | 0 |
| Solids, % | 11.27 | 6.47 | 16.07 | 0.03 | 20.61 |

| | UF step 2 | | |
|---|---|---|---|
| | Feed F | Permeate G | Retentate H |
| Amounts, 1 | 6985.00 | 3104.44 | 3880.56 |
| Protein, % | 4.96 | 0.01 | 8.93 |
| NPN, % | 0.36 | 0.23 | 0.64 |
| Lactose, % | 6.65 | 7.88 | 11.97 |
| Acid, % | 0.45 | 0.30 | 0.81 |
| Total ash, % | 0.92 | 0.63 | 1.65 |
| Fat, % | 3.70 | 0 | 6.66 |
| Solids, % | 17.03 | 9.05 | 30.66 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A process for the regulation of solids components in a dispersion having an aqueous continuous phase, comprising:

feeding said dispersion to a primary filtration membrane in a first primary filtration membrane step;

separating said dispersion into a retentate retained by said primary filtration membrane and a permeate passing through said primary filtration membrane;

feeding the retentate or a portion thereof as the feeding dispersion into one or more succeeding primary filtration membrane steps;

subjecting the permeate or a portion thereof from one or more of the primary filtration membrane steps to a concentration means to form a concentrated fraction containing an increased concentration of dry matter present in the permeate; and returning the concentrated fraction to the feeding dispersion of one or more of said primary filtration membrane steps;

wherein said concentration means is selected from the group consisting of a secondary membrane filtration step, an evaporation step and a combination of such steps; and wherein said secondary membrane filtration step is carried out using one or more secondary filtration membranes having a smaller pore size than the pore size of said primary filtration membrane.

2. A process as claimed in claim 1, wherein the primary filtration membrane is an ultrafiltration membrane, and the secondary membrane is selected from the group consisting of NF-membranes, RO-membranes or a combination thereof.

3. A process as claimed in claim 2, wherein the concentration means is a combination of a nanofiltration membrane and a RO-membrane, and further comprises:

feeding the permeate of the nanofiltration membrane to the RO-membrane, and returning the concentrate resulting from the RO-membrane to the primary ultrafiltration feeding dispersion.

4. A process as claimed in claim 1, wherein the dispersion is a fat containing dispersion.

5. A process as claimed in claim 1, wherein the dispersion is a protein containing dispersion.

6. A process as claimed in claim 1, wherein the dispersion is a fat and protein containing dispersion.

7. A process as claimed in claim 6, wherein the dispersion is selected from the group consisting of milk and a milk product.

8. A process as claimed in claim 1, wherein the primary membrane filtration step is carried out using diafiltration.

9. A process according to claim 1, wherein said dispersion comprises a starting milk and further comprising:

subjecting a permeate from a first primary membrane filtration step to hyperfiltration, or nanofiltration or evaporation, optionally together with a portion of a permeate from a second primary membrane filtration step, and introducing a portion of or the entire obtained concentrate from said hyperfiltration, or nanofiltration or evaporation into the second step; and carrying out the second primary membrane filtration step to a desired solids content, wherein said first and second primary membrane filtration steps comprise ultrafiltration.

10. A process according to claim 9, further comprising adding a portion of or the entire concentrate from said hyperfiltration or nanofiltration or evaporation of the permeate from the first step of the ultrafiltration to the second step of the ultrafiltration.

11. A process according to claim 9, further comprising adding the entire concentrate obtained from hyperfiltration or nanofiltration or evaporation of a combination of the permeate from the first step of the ultrafiltration with a portion of the permeate from the second step of the ultrafiltration to the second step of the ultrafiltration.

12. A process according to claim 9, wherein carrying out the ultrafiltration in the first step is to a solids content in the retentate of 15–35%.

13. A process according to claim 9, wherein carrying out the ultrafiltration in the second step is to a solids content in the product of 18–50%.

14. A process according to claim 9, wherein using hyperfiltration at approximately 30° C. and pH 5.9–6.1 of the permeate from the first step of the ultrafiltration is to a solids content in the concentrate of 10–22%.

15. A process according to claim 9, wherein using nanofiltration at 20°–60° C. of the permeate from the first step of the ultrafiltration to a solids content in the concentrate of 10–40%.

16. A process according to claim 9, wherein evaporation of the permeate from the first step of the ultrafiltration is to a solids content in the concentrate of 10–50%.

17. A process according to claim 9, further comprising regulating the protein/fat ratio in the concentrated product by adjusting the fat percentage of the starting milk.

18. A process according to claim 9, wherein a proportion of lactose in the concentrated product is increase by lowering the solids content in the retentate from the first step of the ultrafiltration and/or increasing the addition of concentrate from the hyperfiltration, nanofiltration or evaporation to the second ultrafiltration step, and/or increasing the solids content in the concentrate from the hyperfiltration or nanofiltration.

19. A system for regulating solids components of a dispersion having an aqueous continuous phase, comprising:

a plurality of primary membrane filtration units, wherein each unit is connected to a feeding pipe, a retentate exit pipe, and a permeate exit pipe wherein said retentate exit pipe of at least one of said units is coupled to the feeding pipe of a succeeding unit;

wherein the permeate exit pipes of said units are individually or collectively coupled to a plurality of concentrating units that separate the permeate into a diluted fraction and a concentrate;

wherein each concentrating unit is coupled to an exit pipe for the diluted fraction and a concentrate exit pipe for the concentrate, each concentrate exit pipe being respectively coupled to a return pipe opening on to one or more of the feeding pipes of said plurality of primary membrane filtration units, wherein said return pipe does not open to the feeding pipe of a first primary membrane filtration unit;

wherein said concentration units are selected from the group consisting of secondary membrane filtration units, evaporation units and combinations thereof; and wherein the membrane of said secondary membrane filtration units has a smaller pore size than the membrane of said primary filtration units.

20. A system as claimed in claim 19, wherein the return pipe is coupled to one or more feeding pipes of the primary membrane filtration units.

21. A system as claimed in claim 19, wherein said concentrating units are coupled in series, wherein the concentrate exit pipe of a first concentrating unit is coupled to a succeeding second concentrating unit.

22. A system as claimed in claim 19, wherein the concentrating units comprise a first membrane unit and a second membrane unit of a pore size being smaller than a pore size of the first membrane unit, and the permeate exit pipe of the first membrane unit is coupled to the second membrane unit.

23. A system as claimed in claim 19, wherein said primary membrane filtration units are microfiltration units and/or ultrafiltration units.

24. A system as claimed in 19, wherein the primary membrane filtration units are ultrafiltration units, and each concentrating unit comprising a nanofiltration unit with a retentate exit pipe for the retentate and a permeate exit pipe for the permeate, wherein the permeate exit pipe is coupled to a RO-unit provided with a permeate exit pipe and a retentate exit pipe, and wherein the retentate exit pipe of the RO-unit is coupled to the return pipe.

25. A system for membrane filtration of a dispersion having an aqueous continuous phase, said system comprising a plurality of primary filtration units, wherein each primary filtration unit is connected to a feeding pipe, a retentate exit pipe, and a permeate exit pipe, wherein the retentate exit pipe of at least one of said primary filtration units is connected to or is an inlet to the feeding pipe of one or more succeeding primary filtration units, wherein the permeate exit pipes of said primary filtration units are individually or collectively coupled to a plurality of concentrating units coupled in series, wherein each concentrating unit is provided with an exit pipe for a diluted fraction and a concentrate exit pipe for a concentrate, and wherein each of said concentrate exit pipes are coupled to a common return pipe opening to one or more of the feeding pipes of said primary filtration units.

* * * * *